United States Patent
Bala et al.

(10) Patent No.: US 7,747,073 B2
(45) Date of Patent: Jun. 29, 2010

(54) METHOD AND APPARATUS FOR ADJUSTING COLOR PROFILES TO MEET A DESIRED AIM

(75) Inventors: Raja Bala, Webster, NY (US); Gaurav Sharma, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1131 days.

(21) Appl. No.: 10/997,528

(22) Filed: Nov. 24, 2004

(65) Prior Publication Data
US 2006/0110031 A1    May 25, 2006

(51) Int. Cl.
*G06K 9/00* (2006.01)
*G03F 3/08* (2006.01)

(52) U.S. Cl. .................... 382/167; 358/518

(58) Field of Classification Search ............. 382/167; 358/518–523
See application file for complete search history.

(56) References Cited

U.S. PATENT DOCUMENTS

| | | | |
|---|---|---|---|
| 5,578,824 A * | 11/1996 | Koguchi et al. ............. 250/318 |
| 5,999,703 A * | 12/1999 | Schwartz et al. ............ 358/1.9 |
| 6,075,888 A * | 6/2000 | Schwartz .................... 382/167 |
| 6,091,518 A * | 7/2000 | Anabuki ..................... 358/500 |
| 6,157,735 A * | 12/2000 | Holub ........................ 382/167 |
| 6,307,961 B1 * | 10/2001 | Balonon-Rosen et al. ... 382/167 |
| 6,707,931 B2 * | 3/2004 | Herbert ...................... 382/112 |
| 6,731,796 B2 | 5/2004 | Maltz et al. |
| 7,339,700 B2 * | 3/2008 | Ohga et al. .................. 358/1.9 |
| 7,382,492 B2 * | 6/2008 | Fujio et al. .................. 358/1.9 |
| 7,453,597 B2 * | 11/2008 | Jodra et al. ................. 358/1.9 |
| 2002/0168104 A1 * | 11/2002 | Muramoto ................. 382/167 |
| 2002/0169805 A1 * | 11/2002 | Edge .......................... 707/528 |
| 2002/0191214 A1 * | 12/2002 | Shimazaki ................. 358/1.15 |
| 2003/0202194 A1 * | 10/2003 | Torigoe et al. .............. 358/1.9 |
| 2006/0044599 A1 * | 3/2006 | Lipowitz et al. ........... 358/1.15 |
| 2006/0072130 A1 * | 4/2006 | DeBaer ...................... 358/1.9 |

OTHER PUBLICATIONS

ICC Profile Format (Specification ICC.1:2003-09, pp. 22-30, 72-74 and 97-102, Sep. 2003).*

* cited by examiner

*Primary Examiner*—Yubin Hung
(74) *Attorney, Agent, or Firm*—Duane C. Basch; Basch & Nickerson LLP

(57) ABSTRACT

A system and method for generating an adjusted profile for a device in response to a specified aim, where the aim may include parameters established in response to a user's specifications, for device emulation, etc.

18 Claims, 5 Drawing Sheets

METHOD AND APPARATUS FOR ADJUSTING COLOR PROFILES TO MEET A DESIRED AIM

CROSS-REFERENCE

The following patents or related applications are hereby incorporated by reference in their entirety: U.S. Pat. No. 6,731,796 for a "Graphical User Interface for Color Transformation Table Editing That Avoids Reversal Artifacts," by M. Maltz et al., issued May 4, 2004, and its related publication US2002/0067847 on Jun. 6, 2002.

Described herein is a system and method for adjusting profiles to accomplish particular aims, and more particularly a system and method for the automated adjustment of color output device profiles in response to a user-specified aim, and including an interface by which the user can characterize such an aim, submit it and in return receive an adjusted profile for use.

BACKGROUND AND SUMMARY

Device profiles provide color management systems with the information necessary to convert color data between native device color spaces and device independent color spaces. The International Color Consortium (ICC) profile specification (e.g., the current Specification ICC. 1:2003-09; File Format for Color Profiles (Version 4.1.0) [REVISION of ICC. 1:2001-12]) classifies color devices as: input devices, display devices and output devices. For each device class, a series of base algorithmic models are described in the ICC which perform the transformation between color spaces. These models provide a range of color quality and performance results that provide different trade-offs in memory footprint, performance and image quality.

The device profiles obtain their openness by using a well-defined reference color space and by being capable of being interpreted by any ICC operating system or application that is compliant with the specification. In combination with profiles for other devices color transformations may be determined that enable colors captured on one device to be reproduced satisfactorily on many others.

The ICC Profile Format supports a variety of device-dependent and device-independent color spaces divided into three basic families: 1) CIEXYZ based, 2) RGB based, and 3) CMY based (including CMYK). A subset of the CIEXYZ based spaces are also defined as connection spaces. Vendors of device color profiles use a wide variety of algorithms for constructing output device profiles. There are variations in the underlying algorithms used to derive the calibration and characterization. More importantly, the gamut-mapping algorithms used in the various rendering intents can be vastly different. This can lead to two problems: i) a user may not be satisfied with the color reproduction obtained with a given vendor's profile; and ii) there is a greater chance for inconsistencies in color reproduction even with a single device or family of devices. In addition, if the user changes the digital front-end (DFE) configuration, jobs that were printed satisfactorily earlier either require significant re-work or a restoration of the configuration. For example, a user of one DFE may adopt a different DFE for a new purchase, but may wish to preserve the "look and feel" of the original DFE for jobs previously rendered on that DFE.

Disclosed herein is a system and method for adjusting a device profile according to a user-specified aim. The desired aim can be specified in one of several ways: i) "Custom parametrics aim", which uses parameters and profiling algorithms as set by the entity; ii) an industry standard aim, e.g. Specification for Web Offset Publications (SWOP) or sRGB; iii) an aim profile; or iv) a graphical user interface to interactively adjust one or more color images, whereby the resulting adjustments collectively define the desired aim. In one embodiment, the user uploads the device profile to a website, and specifies a desired aim. A web-based profile adjustment service derives a new profile that meets the desired aim, and makes it available to the user for downloading at the same site. The profile adjustment service may additionally communicate with a profile discovery service to assist the user in specifying the aim.

The system and method advantageously enable the user to incorporate a desired aim or "look-and-feel" into an existing 3rd party profile without the need for additional measurements, calibration or characterization. They can be used to adjust multiple profiles associated with different vendors and different devices towards a common aim. Finally the system and method can be used for device emulation by specifying, as the aim, a profile for the device being emulated. The invention is easily enforced via the user interface to the service, as well as the resulting adjusted profiles, which are an outcome of a unique combination of original profile and user-specified aim.

One aspect of the system and method described herein is based on an observation of problems with conventional rendering systems, and the difficulty in modifying such system to achieve a preferred output consistency. This aspect is based on the discovery of a technique that alleviates these problems by providing a user with the ability to alter profiles and/or emulate the operation of alternative output devices through profile adjustment. This technique can be implemented, for example, using automated, on-line or local, adjustment of profiles in response to user-specified aims for a color reproduction device. The techniques described herein are advantageous because they provide a range of alternatives, each of which is useful in appropriate situations. As a result of the system and method described in detail below, a user is provided a way in which to adjust a device profile to meet the user's aim.

Figure 1:
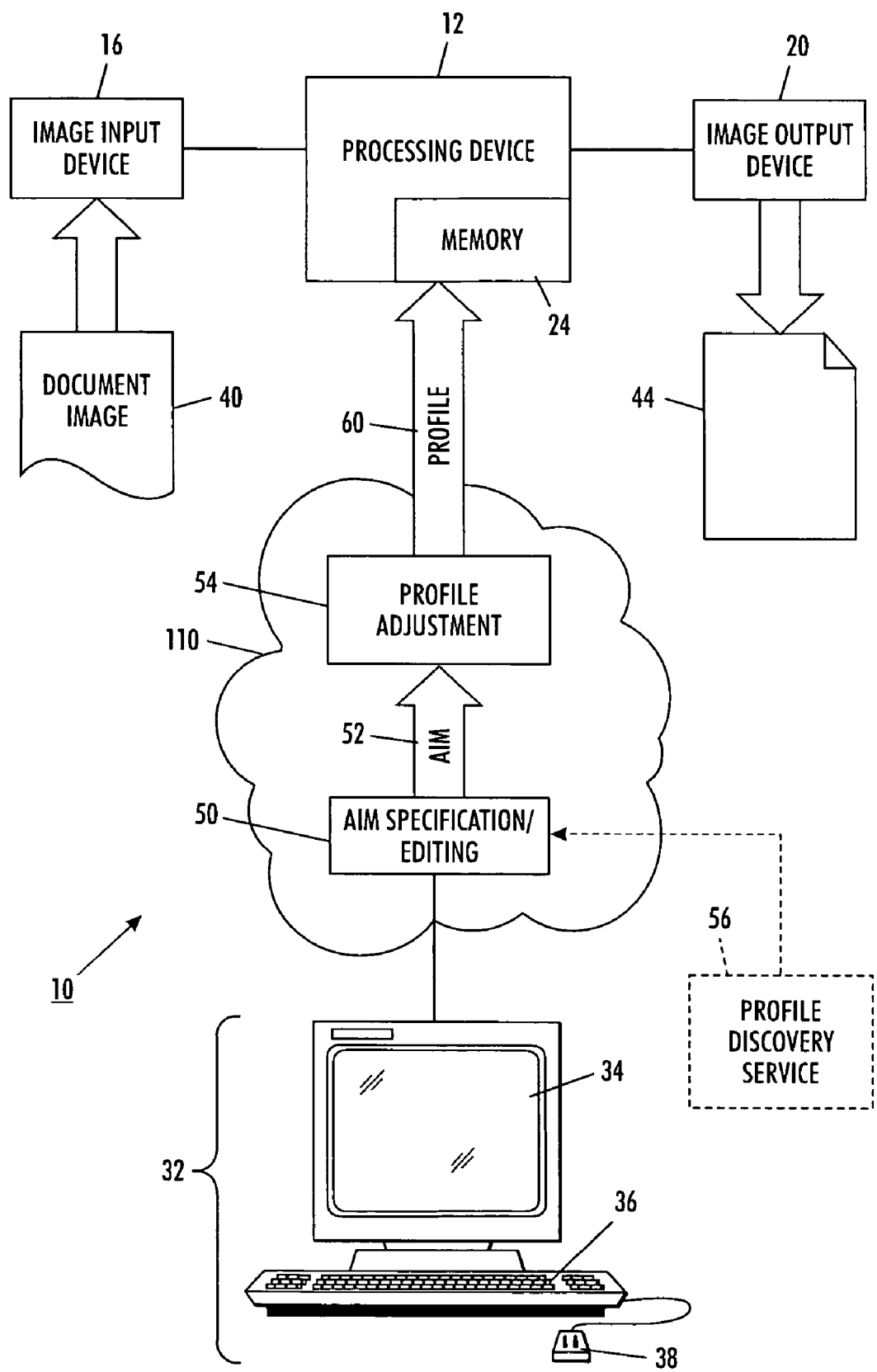
FIG. 1 illustrates a system for creating or editing an aim, or aim characteristic, according to an aspect of the disclosed embodiment.

The following written description includes a preferred embodiment, however, it will be understood that there is no intent to limit the scope of the invention to the embodiment described. On the contrary, the intent is to cover all alternatives, modifications, and equivalents as may be included within the spirit and scope of the description and the appended claims.

DETAILED DESCRIPTION

For a general understanding of the description, reference is made to the drawings. In the drawings, like reference numerals have been used throughout to designate identical elements. In the description, the following term(s) are used.

"Profile" is used to describe a container for color transformations. The most common example is the ICC profile format, and it will be used to illustrate the concepts in this description. Device profiles contain transformations associated with a particular device (e.g. calibration, characterization, gamut-mapping). Abstract profiles contain transformations from and to a device independent color space. The profile provided by the user will be referred to as an "original profile." The resulting profile produced by the service will be referred to as an "adjusted profile."

"Aim" refers to a defined relationship between a known input color and a resulting output color. Both input and output colors are preferably described in device independent coordinates, for example, CIELAB. The aim can be the result of, among others, a certain color preference, or a certain device characteristic.

An "image output device" is a device that can provide output defining an image. A "printer" is an image output device that provides an output image in the form of marks on a medium in response to image data and control information (e.g., profile). A "display" is an image output device that provides information in a visible form. To "present an image" on an image output device is to operate the device so that a viewer can perceive the image.

With reference to FIG. 1, there is depicted an exemplary image rendering system 10 for implementing various aspects and features described herein. System 10 may include an image input device 16 (e.g., a color scanning device or digital camera) and an image output device 20 (e.g., a color printer) each communicating with the processing device 12. In one embodiment the output device may be a xerographic device; alternatively, the output device may employ alternative marking technology and materials (e.g., ink). A memory or memory device 24 is included within the processing device 12; however, other embodiments, in which the memory device 24 is not included within the processing device 12, are also contemplated. To facilitate various user-specified actions, system 10 further includes a graphical user interface 32 and an associated processor or control system—which may be a part of processing device 12, or may be a separate processor (e.g., computer workstation) that is capable of communicating with processing device 12. Interface 32 includes a display (output) device 34 (e.g., a video display), a keyboard 36, and a pointing device 38 (e.g., a mouse). The pointing device 38 permits a user to select features of the information depicted on the display device 34.

As will be described in more detail below, interface 32 is employed by a user to edit or create aims or parameters to otherwise specify desired characteristics of an output device for use in rendering an image such as document image 40 that is input to the rendering system. In one embodiment, the AIM specification editing system 50, which may be a software-based system operating on a processor, provides, in response to a user's selections, information that can be passed to a profile adjustment means or system 54; for example a computer workstation or the like. Adjustment system 54, also a software-based system, which may be web or network hosted, operates on an original image output device profile, in accordance with AIM data from the AIM editing system, to produce an adjusted profile for use in rendering the image 40.

Figure 2:
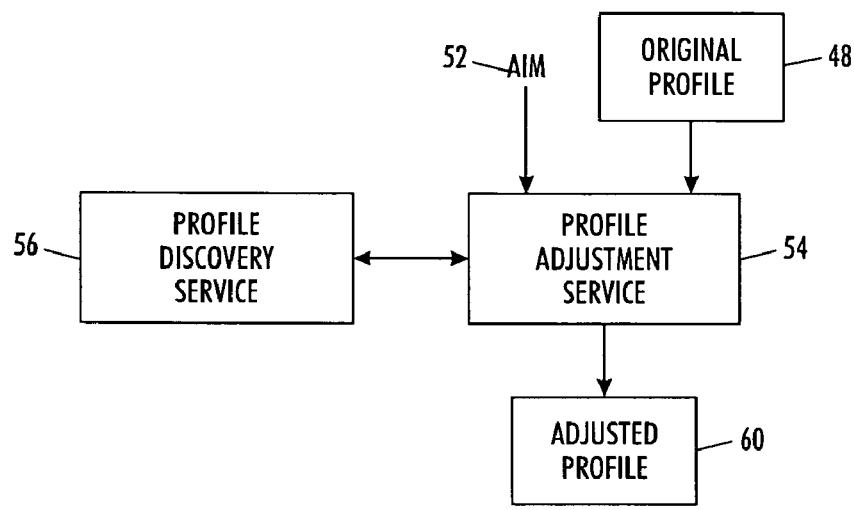
FIG. 2 is a general flow diagram illustrating one general method.

Referring also to FIG. 2, the profile adjustment system may be implemented as a web-based service 110 for adjusting a device profile according to a specified aim or preference. For example, a user might upload a device profile to a website, and specify a desired aim. The web-based profile adjustment service 54 then generates a new profile that meets the desired aim, and makes it available to the user via the website site. The profile adjustment service may communicate with a profile discovery service 56 to assist the user in defining an aim. A block diagram of the basic process carried out by system 10 is illustrated in FIG. 2. In response to user-specified AIM 52 and an original profile 53, profile adjustment service 54 operates to create an adjusted profile 60.

The system and method advantageously enable the user to incorporate a desired aim or "look-and-feel" into an existing third-party profile without the need for additional measurements, calibration or characterization of the device. The system and method may also be used to adjust multiple profiles associated with different vendors and different devices toward a common aim. Finally it can be used for device emulation by specifying as the aim, a profile for the device being emulated. The adjusted profile is preferably a device profile targeted for the same device as the original profile. Alternatively it could be an abstract profile.

Having described the general operation of the system and its associated processing, attention is now turned to a description of several alternative methods in which a desired aim may be specified. Each of the following examples are described, along with the process used to create an adjusted profile. The ICC profile structure is used as an example.

EXAMPLE I

A "custom parametric aim", which uses custom parameters and profiling algorithms to achieve a desired image output. The service would treat an AtoB0 tag in the original profile as the forward characterization function, and invoke the custom parametric algorithms to create the inverse characterization, gamut-mapping, and the various rendering intents. These operations are incorporated into the associated tags (e.g., BtoAN) in the adjusted profile, where the tags contain CLUTs, along with other operations such as TRCs and 3×3 matrices. The inverse algorithms involve many parameters, some of which could be offered as choices to the user (e.g. under-color removal/gray component removal (UCR/GCR), inklimit (IL), tonal reproduction curves (TRC), etc.). Illustrative examples of some of these choices are depicted in the user-interface display 32 of FIG. 6. Note that this approach assumes the presence of a valid AtoB0 tag in the original profile. One way to validate this is to process a set of colors through the BtoA0, followed by AtoB0 tag and ensure that the "round-trip" consistency is within a certain tolerance.

EXAMPLE II

Figure 4:
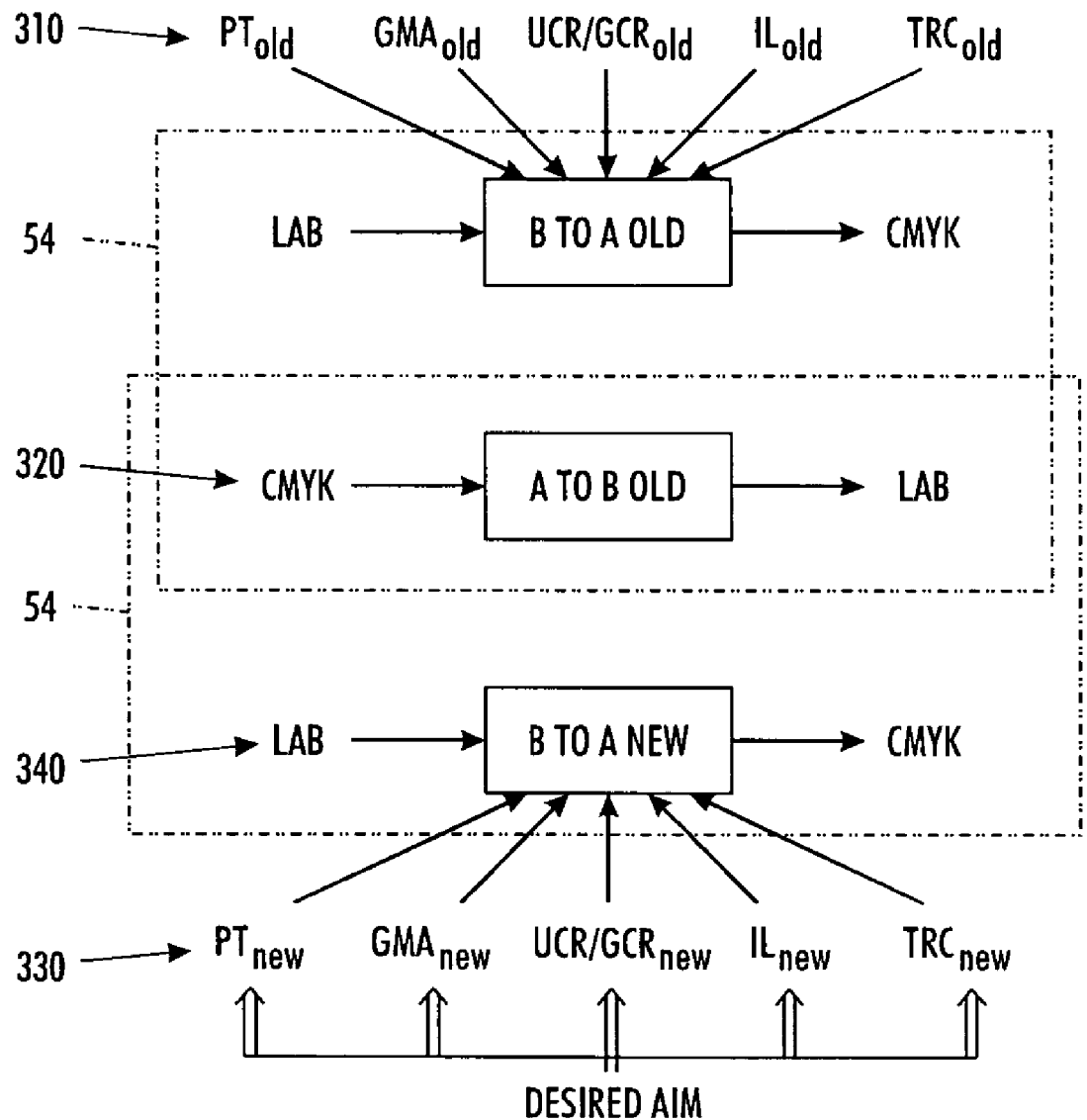
FIG. 4 is an alternative representation of a manner in which an adjusted profile is generated based upon an existing profile.

A predefined industry standard aim (e.g. Specification for Web Offset Publications (SWOP)). The aim is defined as the relationship between the colors sent to a SWOP press, and the resulting printed colors, and could be represented as a transform to and from colorimetric space. The BtoAN tag in the adjusted profile could be created by processing a set of colors in the profile connection space (PCS) through the SWOP aim (derived a priori), and then through the inverse calorimetric (BtoA0) transform associated with the original profile, to produce a set of device color values. The original PCS colors and the device colors are used to derive a new BtoAN tag. This is then combined with the AtoBN tag from the original profile to form the new adjusted profile, as generally depicted in FIG. 4.

EXAMPLE III

Figure 6:
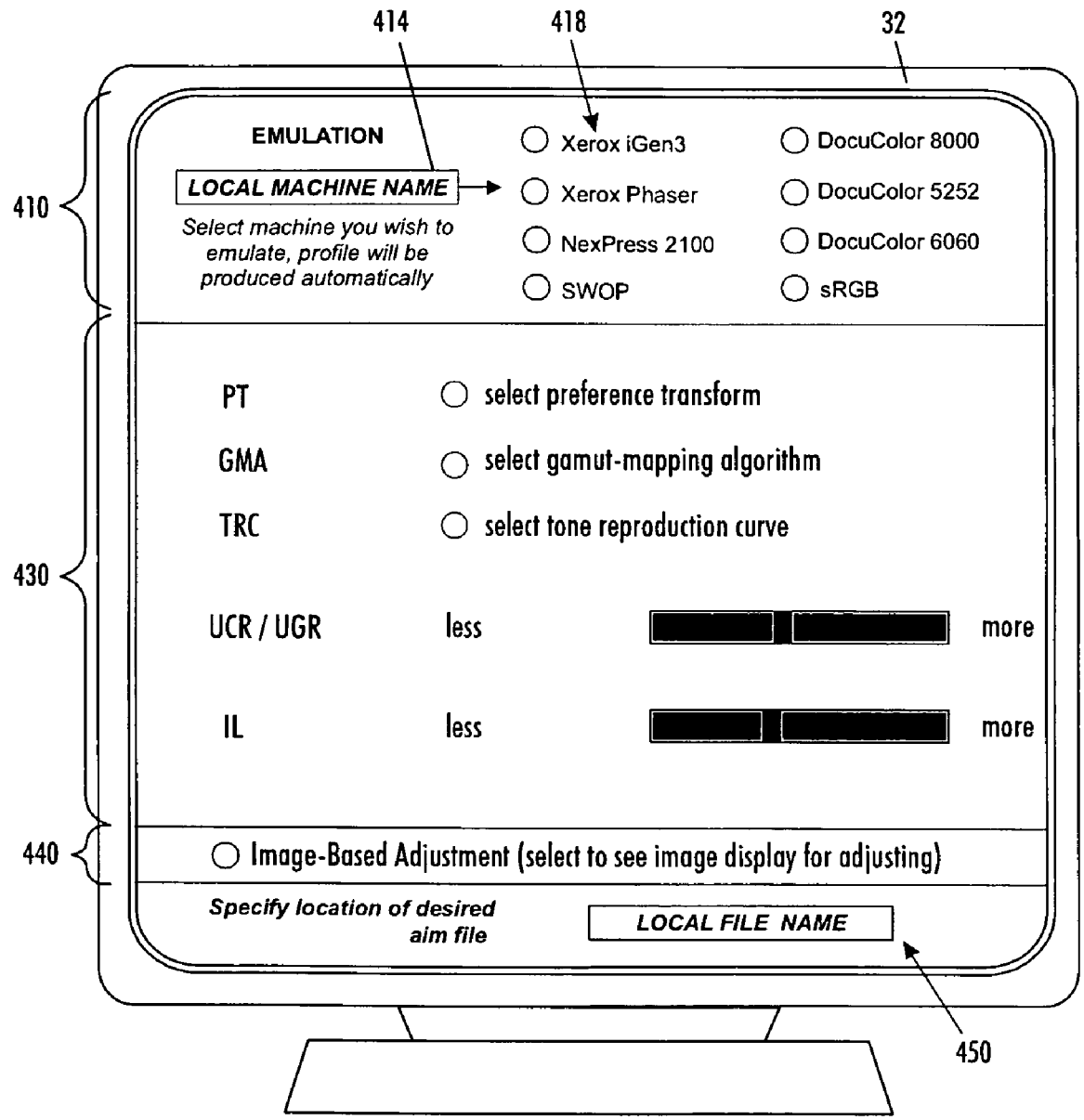
FIG. 6 is an illustrative user interface for aim specification in accordance with one embodiment.

An aim profile. This could be either directly supplied by the user-specified aim as depicted in FIG. 6, or obtained with the help of a profile discovery service. The aim profile could be an abstract profile containing a preference transformation in calorimetric space. In this case, a grid of PCS colors is mapped through the abstract profile, then through the inverse colorimetric (BtoA0) transform associated with the original profile. Alternatively, as depicted in the top portion of display 32 (FIG. 6), the aim could be a device profile for a device that the user wishes to emulate. In this case, the BtoA tag in the N-th rendering intent in the adjusted profile (denoted BtoAN) is created in the following exemplary manner:
 a) process a set of PCS colors through the BtoAN followed by AtoBN tags in the aim profile; and
 b) process the result of step (a) through the calorimetric BtoA0 tag of the original profile to obtain device color values
 c) combine the PCS colors and the device colors to form the BtoAN tag of the new adjusted profile.

EXAMPLE IV

A graphical user interface may be employed, similar to FIG. 6, to interactively adjust one or more color images that are also displayed interactively, whereby the resulting adjustments collectively define the desired aim as a transform in calorimetric space. Details of one such embodiment are found in U.S. Pat. No. 6,731,796 to M. Maltz et al., previously incorporated herein by reference. The adjusted profile can also be created in the same manner as with the abstract aim profile in Example III above.

Figure 3:
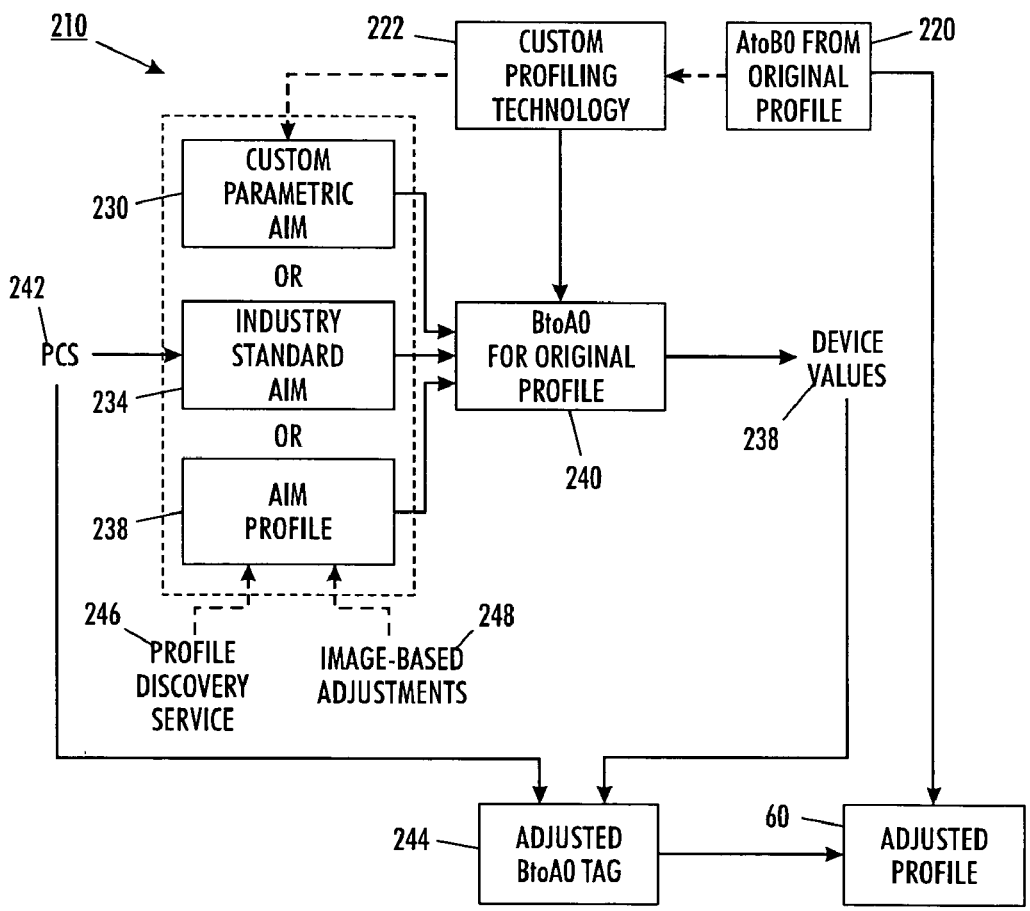
FIG. 3 is a detailed flow diagram illustrating a more detailed embodiment of the method of FIG. 2.

Having described, in general various approaches of arriving at a desired aim, attention is now turned to FIG. 3, which is a block flow diagram of the profile adjustment operation 210 illustrating some of the variations described in the examples above. In particular, operation 210 illustrates three alternative means by which an aim may be specified. For the "custom parametric aim", the process as described in Example I above, takes an AtoB0 tag 220 in the original profile as the forward characterization function (characteristics of the image output device), and invokes the custom parametric algorithms 222 to create the intended inverse characterization, gamut-mapping, and the various rendering intents that form the custom aim 230.

In a similar manner, an industry standard aim 234 may be specified to define a standard relationship—for example, the colors sent to a SWOP press. The aim could be represented as a transform to and from calorimetric space. The adjusted profile 60 would be created by processing a set of colors in the profile connection space (PCS) through the SWOP aim. As with the custom parametric aim 230, once determined the aim is processed through the inverse calorimetric (BtoA0) transform 240 associated with an original profile, to produce the adjusted profile 60.

In the last case illustrated in FIG. 3, the aim 238 is obtained from a profile discovery service 246 and/or in response to particular image-based adjustments 248 specified by a user, and the aim 248 is input to the inverse calorimetric (BtoA0) transform 240 associated with an original profile, to produce the adjusted profile 60 using device values 238. These operations are incorporated into the associated (e.g., BtoAN) tags 244, in the adjusted profile 60.

Referring next to FIG. 4, there is depicted a generalized representation of at least Example I above. It will be appreciated by those familiar with color management techniques that it is possible to build the noted inverse transforms from a forward characterization function; to process color data through existing profiles; to pre-construct profiles for various industry standards; and to incorporate image-based adjustments into profiles. In particular, a series of color management parameters 310 (preference transform (PT), gamut mapping algorithm (GMA), undercolor removal and gray component replacement (UCR/UGR), inklimit (IL) and tone reproduction correction (TRC)) may be first specified by the user, then combined with the forward transform (i.e. AtoB tag) of the original profile 54 to make the new adjusted profile 60.

Figure 5:
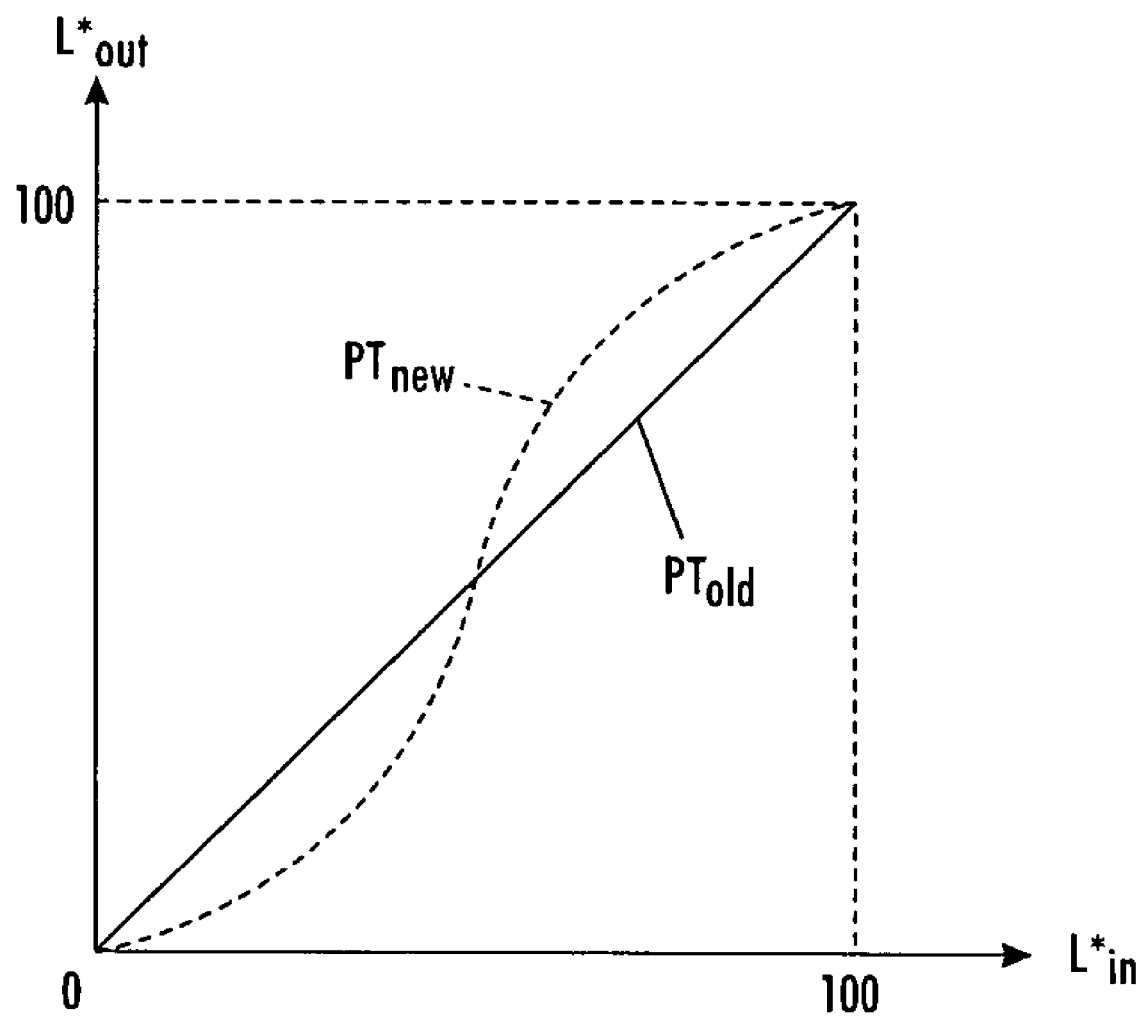
FIG. 5 is an illustrative representation of old and new tonal reproduction curves in accordance with an embodiment described below.

As further illustrated in FIG. 5, the transform of FIG. 4 may include a preference transform aim that seeks to provide greater contrast than is achieved with the existing device profile. Accordingly, a user might adjust a preference transform function (e.g., contrast) on a user-interface, and thereby specify greater contrast. In other words, a user could specify the $PT_{new}$ function in FIG. 5 be used in place of the existing straight-line contrast indicated as $PT_{old}$.

Turning now to FIG. 6, there is depicted an exemplary user interface that might be employed on a computer interface such as a display as described with respect to FIG. 1. In the example depicted, interface 32 would include a screen for illustrating one or more choices to a user for specification of a particular aim. The aim might be characterized, as in region 410 of the display, as a selected output device to be emulated. In region 410 is a location to specify the device that the adjusted profile will emulate (field 414), as well as a plurality of emulation selections 418, which may be selected by radio-type buttons. Alternatively, the user may be inclined to adjust or control one or more color imaging parameters as set forth in region 430. Although depicted as user-adjustable slide selections or "radio-type" buttons, it will be appreciated that any of a number of user-input functions may be employed to select particular parameter settings and that additional menus or windows may be employed, including but not limited to, fill-in fields, and pull-down menus with pre-specified values. For example, selection of a radio button could pop-up a new window with parameters to choose from or alter.

Region 440 of the interface includes a radio-type button or the like that enables image based adjustment. Selection of this button would result in the display of a simulated image, wherein modification of one or more parameters would result in an approximation of such modifications being depicted or illustrated in at least a windowed region of the display screen. Once a desired set of parameters is identified, a user would be able to "select" the settings and proceed as described above. Lastly, region 450 is intended to provide a user the ability to indicate a file name containing aim parameters that are desired. In this fashion, it may be possible to set and store aim setting for one or more devices and/or situations that a user might wish to use in the future. Although not depicted in the display representation of FIG. 6, it will be appreciated that typical Windows-like toolbar functionality may be provided on the interface in order to save and restore aim files from memory, either on the interface device 32 or associated with a processing device 12, memory 24 as depicted in FIG. 1.

In recapitulation, the present description is directed to a method and apparatus for generating an adjusted profile for a device in response to a specified aim. While this invention has been described in conjunction with embodiments thereof, it is evident that many alternatives, modifications, and variations will be apparent to those skilled in the art.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for generating an adjusted color profile for a printing device, comprising:
   receiving an original profile for the device, said original profile selected by the user;
   generating, using a user interface responsive to a user's selection, an aim defining a multi-parameter relationship between a known input color and a resulting output color for the device where the colors are described in device independent coordinates, and wherein the aim includes at least one user-specified color preference;
   accepting, from the user interface, the aim defining a multi-parameter relationship between a known input color and a resulting output color for the device; and
   creating, in response to the original profile and the aim, an adjusted profile for the device wherein creating an adjusted profile further includes:
   taking an AtoB0 tag in the original profile as the forward characterization function; and
   invoking a custom parametric algorithm and creating at least an intended inverse characterization and gamut-mapping that are included within the aim.

2. The method of claim 1, wherein the aim is generated in response to a selected image output device for emulation.

3. The method of claim 1, wherein creating an adjusted profile further includes:
   determining the forward transform for the device based upon the original profile;
   combining the aim with an inverse colorimetric transform associated with an original profile for the device; and
   producing the adjusted profile using, in combination, the forward transform and the aim combined with the inverse colorimetric transform.

4. The method of claim 3, wherein the aim is obtained from a pre-existing data source.

5. The method of claim 4, wherein the pre-existing data source is accessed via a profile discovery service.

6. The method of claim 1, wherein the aim defining a multi-parameter relationship is specified in accordance with an image based adjustment of the parameter.

7. The method of claim 1, wherein the aim includes a parameter selected from the group consisting of:
   preference transform; and
   gamut mapping algorithm.

8. The method according to claim 1, wherein said aim includes a custom parametric aim that uses custom parameters and profiling algorithms to achieve a desired image output.

9. The method according to claim 1, wherein said aim includes a predefined industry standard aim characterizing the relationship between the colors sent to a SWOP press and the resulting printed colors, represented as a transform to and from colorimetric space.

10. A web-based system for generating an adjusted color profile for an image output device, comprising:
    a source of an original profile for the image output device, said source providing the original profile in response to a user selection;
    a web-based interface, responsive to a user's selection, for indicating an aim defining a multi-parameter relationship between a known input color and a resulting output color where the aim includes at least one parameter that is user-specified via the interface, and wherein said interface depicts a plurality of selections, at least one of which is used to indicate a user's preference as to the manner in which an aim will be specified; and
    a processor for generating, in response to the original profile and the aim, an adjusted profile for the image output device.

11. The system of claim 10, wherein the interface provides for selection a plurality of devices for emulation, and where the aim is generated in response to a selection of one of the plurality of devices for emulation.

12. The system of claim 10, further including a pre-existing data source from which the aim is obtained.

13. The system of claim 12, further including a network, said network having access to the pre-existing data source, wherein the aim is obtained via a profile discovery service.

14. The system of claim 10, wherein the at least one parameter is specified in accordance with an image based adjustment of the parameter.

15. The system of claim 10, wherein said processor is a software-driven system accessible via a network.

16. The system of claim 10, wherein said interface further includes at least one selection button to indicate a device to emulate as the user's preference.

17. The system of claim 10, wherein said interface further includes at least one parameter for adjustment in accordance with the user's preference.

18. The system of claim 10, wherein the interface further includes at least one field for the user's specification of location in which at least one aim parameter is stored in a memory.

* * * * *